United States Patent
Walenty et al.

(10) Patent No.: US 6,490,518 B1
(45) Date of Patent: Dec. 3, 2002

(54) ANTI-LOCK BRAKE CONTROL METHOD HAVING ADAPTIVE EXIT CRITERIA

(75) Inventors: Allen John Walenty, Macomb, MI (US); Kevin Gerard Leppek, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/893,483

(22) Filed: Jun. 29, 2001

(51) Int. Cl.[7] .................................................. B60T 8/00
(52) U.S. Cl. .......................... 701/71; 701/80; 303/176; 303/157
(58) Field of Search .............................. 701/71, 73, 74, 701/78, 79, 80; 180/179; 303/138, 176, 157

(56) References Cited

U.S. PATENT DOCUMENTS

| | | | | |
|---|---|---|---|---|
| 5,190,361 A | * | 3/1993 | Onaka et al. | 188/181 A |
| 5,261,730 A | * | 11/1993 | Steiner et al. | 303/113.4 |
| 5,281,009 A | * | 1/1994 | Kidston et al. | 303/156 |
| 5,366,281 A | * | 11/1994 | Littlejohn | 188/156 |
| 5,492,397 A | * | 2/1996 | Steiner et al. | 303/157 |
| 5,511,862 A | * | 4/1996 | Fujioka | 303/113.4 |
| 5,535,123 A | * | 7/1996 | Rump et al. | 303/155 |
| 6,125,319 A | * | 9/2000 | Hac et al. | 303/150 |
| 6,212,458 B1 | | 4/2001 | Walenty et al. | 701/51 |

* cited by examiner

*Primary Examiner*—Michael J. Zanelli
*Assistant Examiner*—Eric M Gibson
(74) *Attorney, Agent, or Firm*—Christopher DeVries

(57) ABSTRACT

An improved anti-lock brake control method adaptively determines exit criteria for terminating anti-lock brake control based on rate of brake pedal release and estimates of the brake torque and road surface coefficient of friction. The brake torque and road surface coefficient of friction are estimated based on a periodically updated characterization of the relationship between brake pedal position and vehicle deceleration.

16 Claims, 5 Drawing Sheets

ANTI-LOCK BRAKE CONTROL METHOD HAVING ADAPTIVE EXIT CRITERIA

TECHNICAL FIELD

This invention relates to motor vehicle anti-lock brake systems, and more particularly to a control method that adaptively determines exit criteria for terminating anti-lock brake pressure modulation.

BACKGROUND OF THE INVENTION

A motor vehicle anti-lock braking system (referred to herein as an ABS system) repeatedly releases and re-applies hydraulic brake pressures during conditions of wheel lock to maximize the tractive force between the vehicle tires and the road surface. Typically, the control is initiated in response to insipient wheel lock detection, and is exited when the driver fully releases the brake pedal or the vehicle deceleration vs. wheel slip operating point is in an exit region for at least a predetermined exit time interval. This strategy can unnecessarily delay the termination of ABS control when the driver only partially releases of the brake pedal, which is undesirable, particularly when the road surface coefficient of friction is relatively high. Accordingly, what is needed is method of exiting ABS control that reduces the exit delay, consistent with the road surface coefficient of friction, when the brake pedal is only partially released.

SUMMARY OF THE INVENTION

The present invention is directed to an improved ABS control method in which exit criteria for terminating ABS control are adaptively determined based on rate of brake pedal release and estimates of the brake torque and road surface coefficient of friction. In the preferred embodiment, the brake torque and road surface coefficient of friction are estimated based on a periodically updated characterization of the relationship between brake pedal position and vehicle deceleration. In one aspect of the invention, an exit time interval is adaptively adjusted based on the estimated road surface coefficient of friction, and a control value used to determine if ABS control should be exited is adaptively biased toward exiting ABS control based on the brake pedal release rate and the estimated brake torque. In another aspect of the invention, ABS control is exited independent of the timer when the control value indicates that ABS control should be exited and the brake pedal release rate exceeds a threshold, provided the vehicle deceleration is higher than expected, based on the estimated road surface coefficient of friction. In another aspect of the invention, the ABS control is exited independent of the timer if the control value indicates that ABS control should be exited and the brake torque corresponding to the pedal position is significantly less than the maximum possible brake torque, given the estimated road surface coefficient of friction.

DESCRIPTION OF THE PREFERRED EMBODIMENT

Figure 1:
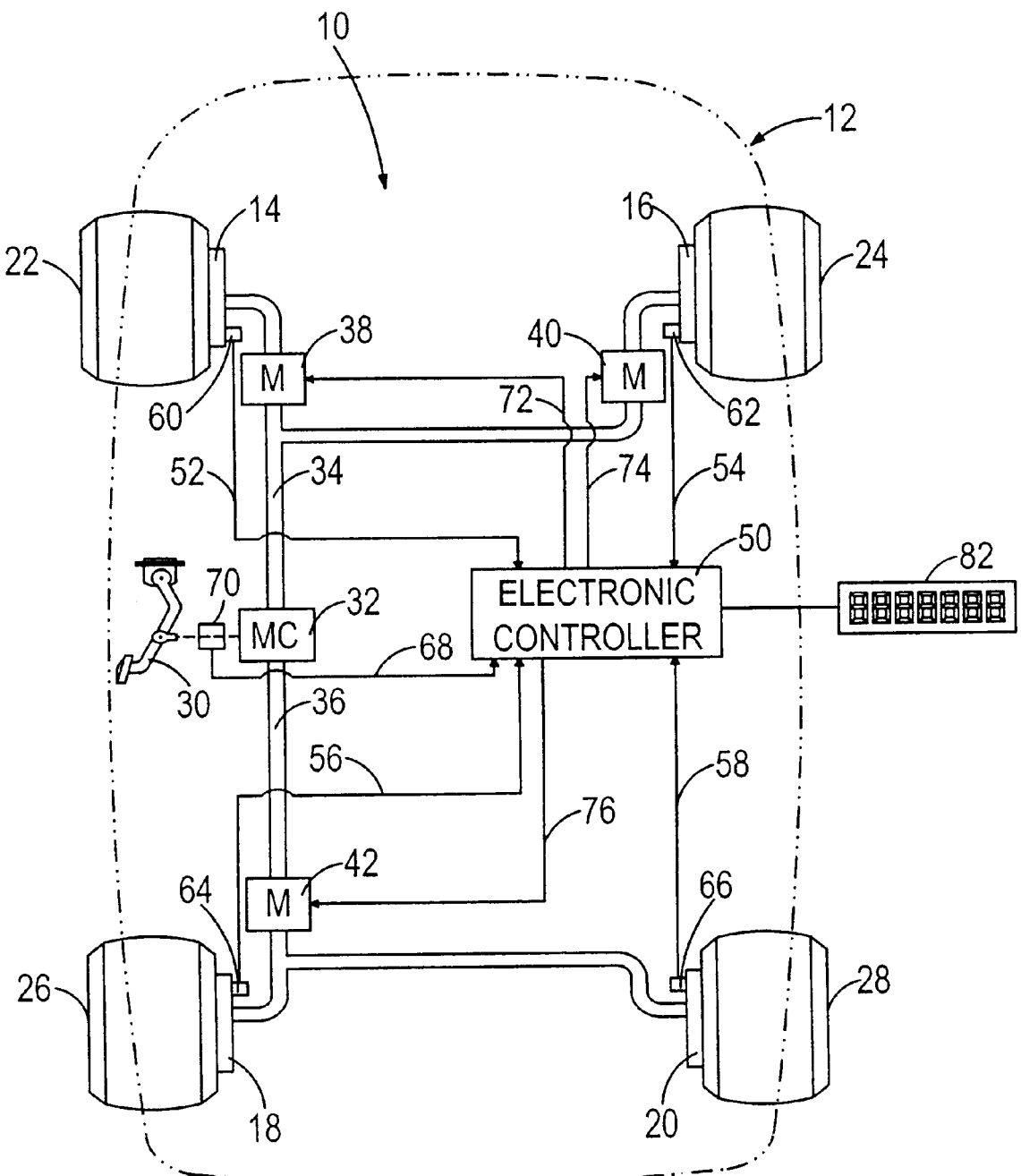
FIG. 1 is a schematic diagram of a vehicle ABS system, including a brake pedal position sensor, and a microprocessor-based control unit programmed to carry out the method of this invention.

Referring to FIG. 1, the present invention is disclosed in the context of an ABS system 10 for a vehicle 12 having hydraulically-activated friction brakes 14, 16, 18, 20 at each of four vehicle wheels 22, 24, 26, 28. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front ABS modulator (M) 38, and to the right front service brake 16 via right-front ABS modulator (M) 40. Rear supply line 36 is coupled to the left and right rear wheel brakes 18, 20 via rear ABS modulator (M) 42.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64 66 and 70 may be implemented with conventional devices in a manner known to those skilled in the art. In response to the various inputs, the control unit 50 outputs modulator control signals on lines 72, 74, 76 during wheel lock-up conditions, and diagnostic information signals on line 80 for display on a driver information device 82.

Figure 2:
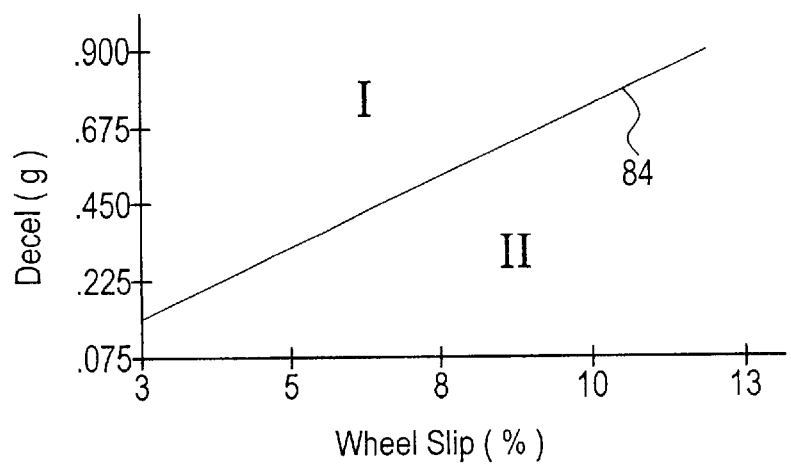
FIG. 2 is a graph depicting a prior art technique for defining ABS control regions in terms of vehicle deceleration and wheel slip.

In general, the control unit 50 monitors the measured wheel speeds to detect a condition of insipient wheel lock, and then controls modulators 38, 40, 42 to modulate the respective hydraulic brake pressures so as to maximize the tractive force between the vehicle tires and the road surface. In a conventional system, ABS control is terminated when the brake pedal 30 is fully released, or when the vehicle deceleration and wheel slip are such that ABS control is no longer needed. FIG. 2 illustrates a prior art approach in which a vehicle deceleration vs. wheel slip table is used to delineate two regions: Region I above the trace 84 for which ABS control is not needed, and Region II below the trace 84 for which ABS control is needed. As a practical matter, Region II of the table may contain other information, such as brake pressure apply and release rates. According to the conventional approach, ABS control is terminated if the vehicle remains in Region I for at least a predetermined exit time interval. As indicated above, however, this exit strategy tends to unnecessarily delay termination of ABS control when the driver only partially releases the brake pedal 30. This issue is addressed by the present invention, which adaptively determines exit criteria based on the rate of brake pedal release and estimates of the brake torque and the road surface coefficient of friction. As described below, the brake torque and road surface coefficient of friction are estimated based on the brake pedal position and a periodically updated characterization of the relationship between brake pedal position and vehicle deceleration.

Figure 3:
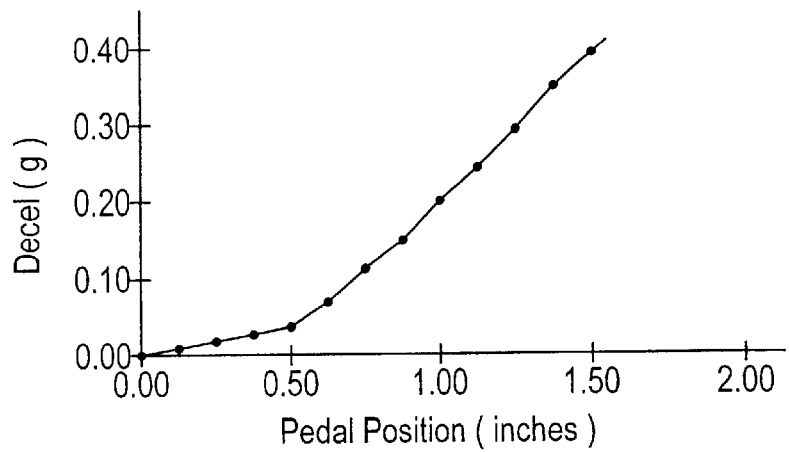
FIG. 3 is a graph depicting vehicle deceleration as a function of brake pedal position for the braking system of FIG. 1.

FIG. 3 graphically depicts a representative relationship between vehicle deceleration and brake pedal position for defined braking of the vehicle 12, assuming that there is no lock-up condition and the modulators 38, 40, 42 are inactive.

Typically, the "knee" portion of the relationship varies considerably from stop to stop, whereas the portion of the relationship above the knee tends to be linear and repeatable from stop to stop. For this reason, the knee portion of the relationship is ignored for purposes of this invention, and the brake pedal position vs. vehicle deceleration relationship is characterized only for pedal positions and vehicle decelerations in the linear portion above the knee. In the illustrated embodiment, depicted in FIG. 4, the characterization data is collected by identifying the pedal position values PPCUR1, PPCUR2 and PPCUR3 corresponding to three different vehicle deceleration values D1, D2 and D3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 or during panic braking. This eliminates the need to compensate for the effects of suspension and powertrain dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see for example, the U.S. Pat. No. 6,212,458 to Walenty et al., issued on Apr. 3, 2001, and incorporated herein by reference.

The characterization table is periodically updated to reflect a current condition of the braking effectiveness, and the brake torque BRAKE_TQ for any brake pedal position PP greater than or equal to PPCUR1 can be determined according to the expression:

$$\text{BRAKE\_}TQ=[((PP-PPCUR1)*(PPCUR3-PPCUR1)/(D3-D1))*Kbt]+(\text{UPDATE\_BRAKE\_HEAT-BRAKE\_HEAT})*Kheat \quad (1)$$

where Kbt is a brake torque constant, UPDATE_BRAKE_HEAT is the estimated brake temperature when the characterization table was last updated, BRAKE_HEAT is a current estimate of the brake temperature, and Kheat is a constant for converting the quantity (UPDATE_BRAKE_HEAT BRAKE_HEAT-BRAKE_HEAT to a corresponding difference in brake torque. Thus, the brake torque obtained from the characterization table is compensated for differences in brake temperature; for example, BRAKE_TQ is reduced if BRAKE_HEAT is higher than UPDATE_BRAKE_HEAT, and vice-versa.

The brake temperature term BRAKE_HEAT can be modeled reasonably well, and is continuously updated regardless of whether the brakes are activated. For example, BRAKE_HEAT may be estimated as:

$$\text{BRAKE\_HEAT}=\text{BRAKE\_HEAT}-((VSPD+K1)^2*K2)*(\text{BRAKE\_HEAT}-(\text{BRAKE\_HEAT}*Tamb)+(\text{BRAKE\_}TQ*Kheat*VSPD)*(K3-\text{BRAKE\_HEAT})/K3 \quad (2)$$

where K1, K2 and K3 are constants, Tamb is the ambient temperature, and VSPD is the vehicle speed.

Since changes in the vehicle weight change the characterization table data, the vehicle weight is updated each time the braking characterization table is updated, according to:

$$V\_WT=V\_WT(\text{last})+WT\_DELTA \quad (3)$$

where WT_DELTA is a measure of the change in characterization data, compensated for changes in brake temperature. Specifically, WT_DELTA is given by the expression:

$$WT\_DELTA=[(((PPCUR3\text{old}-PPCUR1\text{old})-(PPCUR3-PPCUR1))/(D3-D1))*Kwt]+(\text{UPDATE\_HEAT BRAKE\_HEAT-BRAKE\_HEAT})*Kheat \quad (4)$$

where Kwt is a weight constant. In turn, the coefficient of friction between the vehicle tires and the road surface (SURFACE_MU) is given by:

$$\text{SURFACE\_MU}=(\text{BRAKE\_}TQ/V\_WT)*Kmu \quad (5)$$

where Kmu is a constant.

According to the present invention, the above information is used along with the brake pedal release rate to define adaptive exit criteria that reduce the ABS exit delay, consistent with SURFACE_MU, when the brake pedal 30 is only partially released. In one aspect of the invention, the exit time interval is adaptively adjusted based on SURFACE_MU, and a control value (ABS_COMMAND) used to determine if ABS control should be exited is adaptively biased toward exiting ABS control based on the brake pedal release rate and BRAKE_TQ. In another aspect of the invention, ABS control is exited independent of the timer when ABS_COMMAND indicates that ABS control should be exited and the brake pedal release rate exceeds a threshold, provided the vehicle deceleration is higher than expected, based on SURFACE_MU. In another aspect of the invention, the ABS control is exited independent of the timer when ABS_COMMAND indicates that ABS control should be exited and BRAKE_TQ is significantly less than the maximum possible brake torque, given SURFACE_MU.

Figure 5:
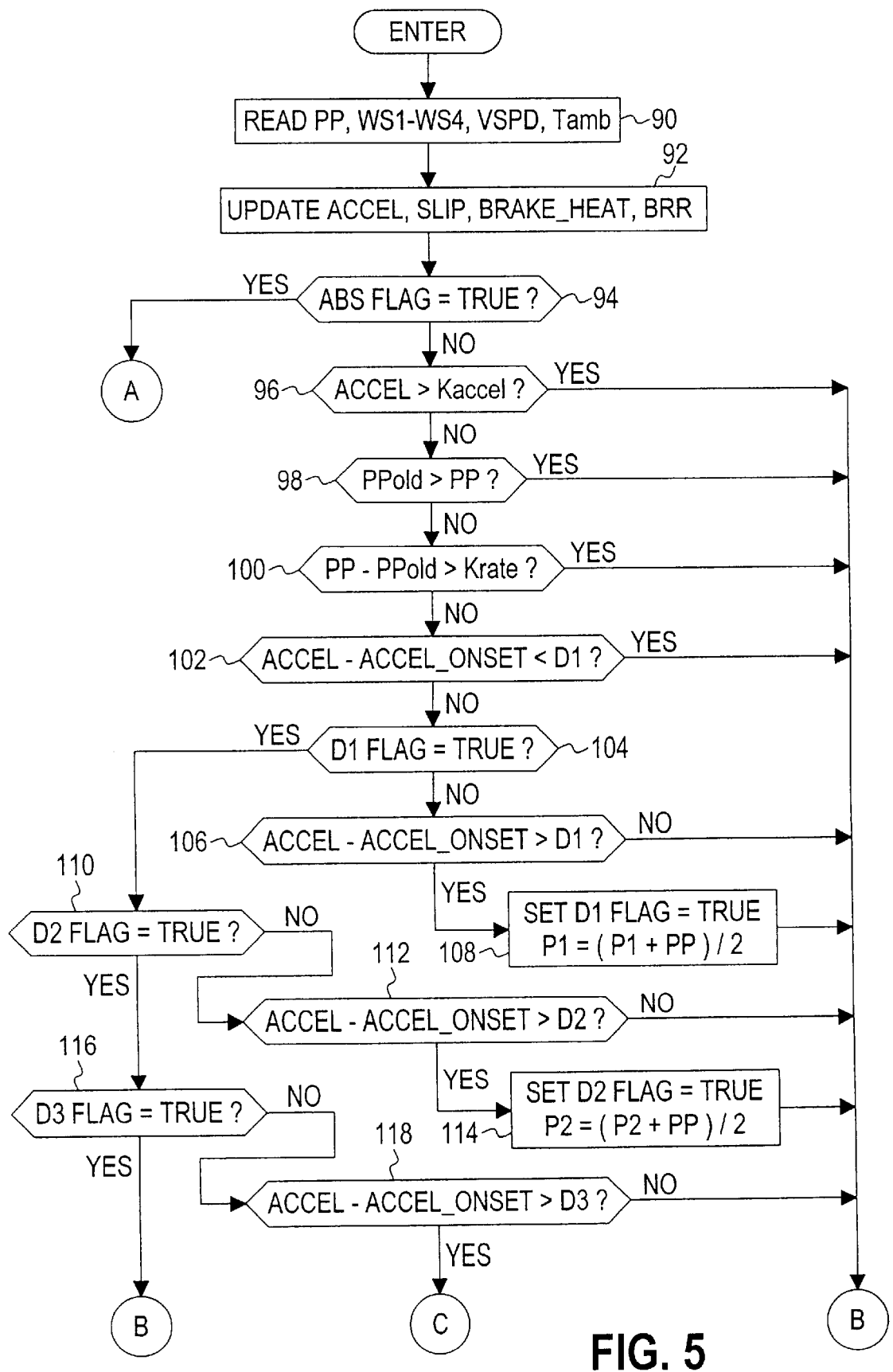
FIGS. 5–7 depict a computer software routine executed by the control unit of FIG. 1 for carrying out the control method of this invention.
Figure 6:
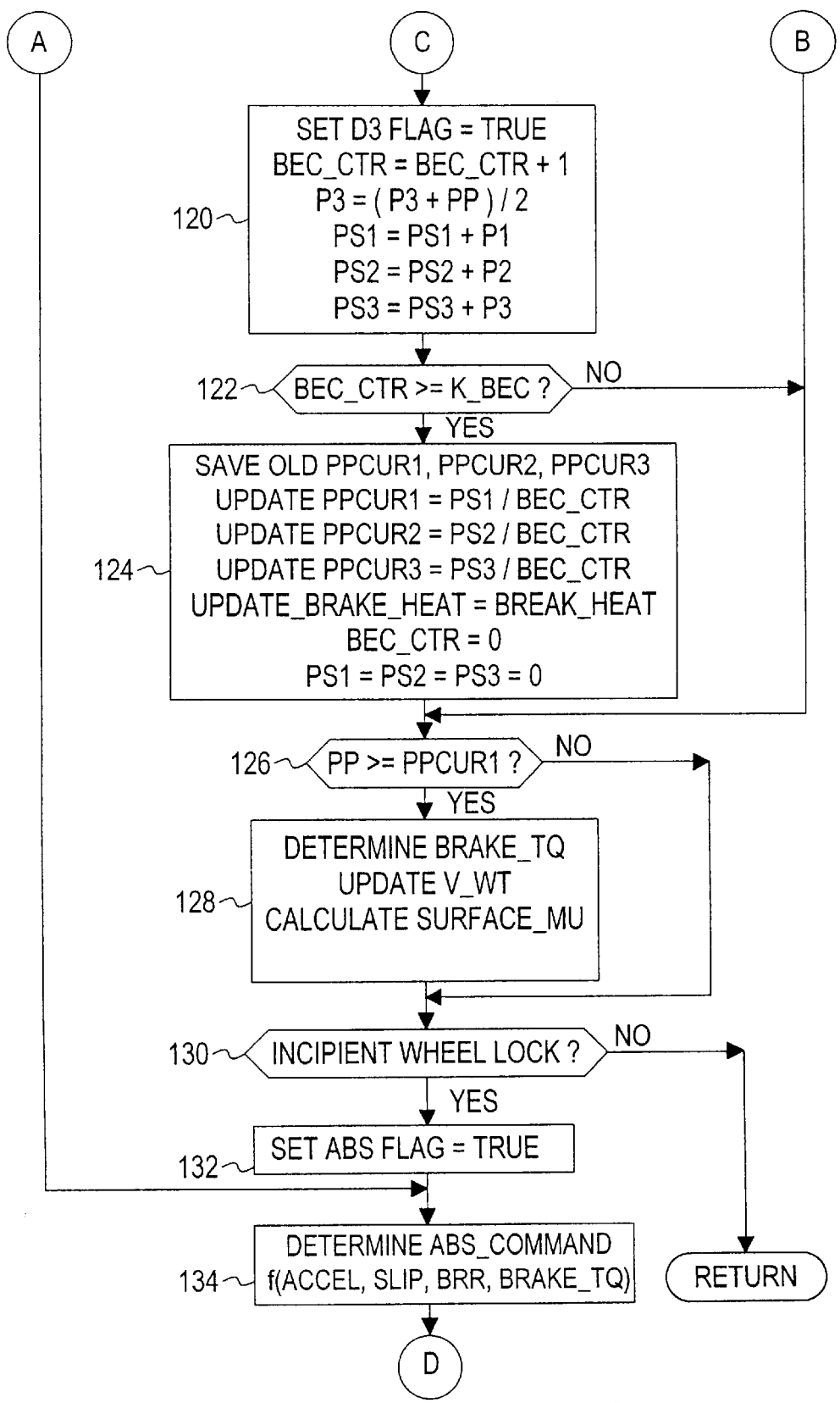
Figure 7:
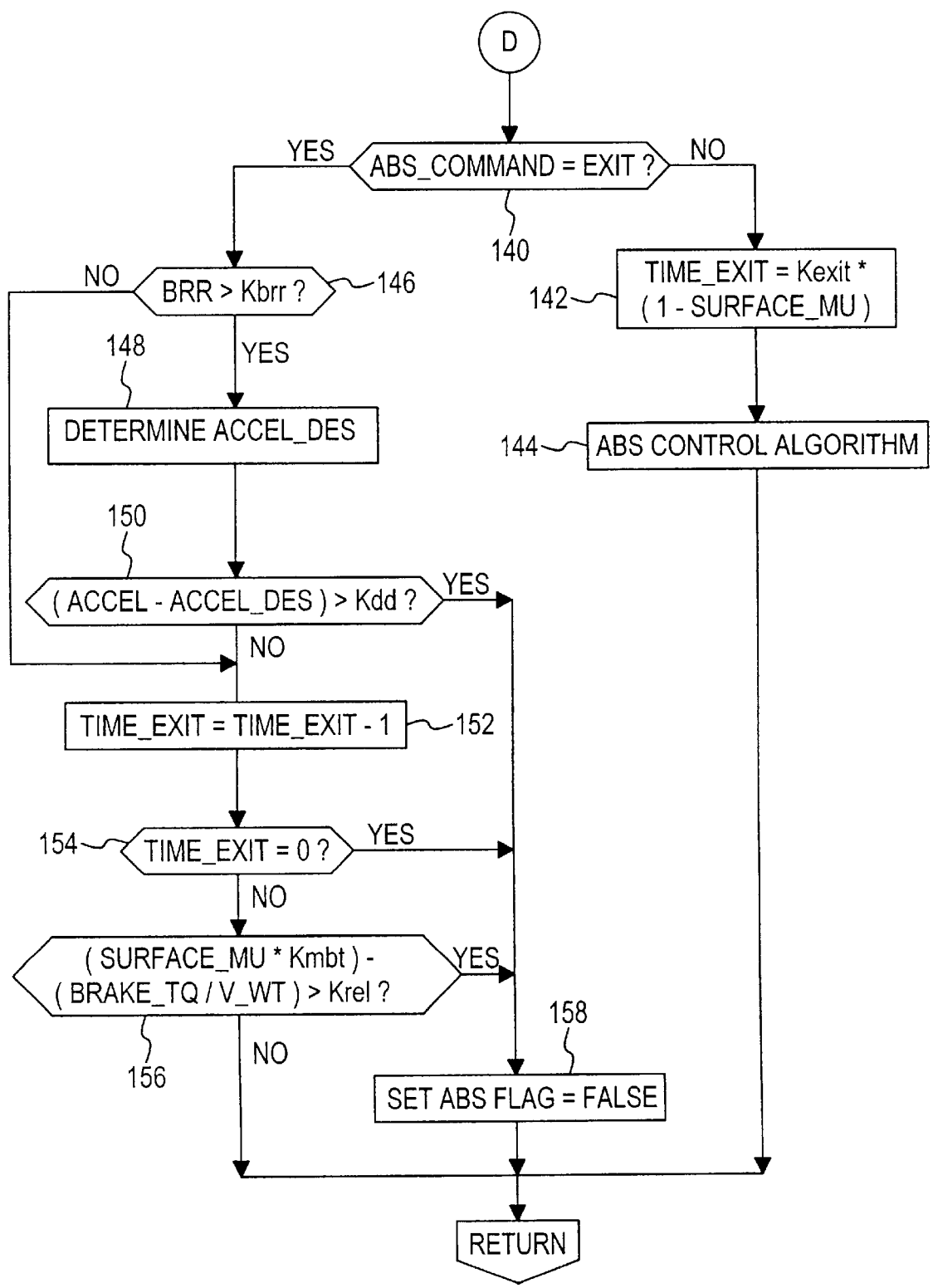

The method of the invention is illustrated by the flow diagram of FIGS. 5–7, which represents a software routine periodically executed by control unit 50 of FIG. 1. The routine serves to collect the braking system characterization data, to update the estimated brake torque BRAKE_TQ and road surface coefficient of friction SURFACE_MU, and once ABS control has been initiated, to determine if the adaptive exit criteria are met. Referring to FIG. 5, the input processing blocks 90 and 92 are first executed to read the brake pedal position PP and the wheel speeds (WS1–WS4), to compute the vehicle acceleration ACCEL (compensated for road grade and vehicle weight) and wheel slip, and to update BRAKE_HEAT using equation (2). Also, the vehicle acceleration when the brake pedal is initially depressed is saved as the onset acceleration ACCEL_ONSET. Block 94 then checks the ABS FLAG to determine if ABS control is active. Ordinarily, the ABS FLAG is FALSE, and a portion of the routine comprising the blocks 96–124 is executed to collect braking system characterization data. If insipient wheel lock has been detected, and the modulators 38, 40, 42 have been activated to release brake pressure, the ABS FLAG will be TRUE; in this case, the data collection portion of the routine is skipped, and the block 134 is executed to determine the value of ABS_COMMAND, as explained below. If block 94 is answered in the negative, the data collection portion of the routine (blocks 96–102) is executed to detect the presence of braking activity that is suitable for brake system characterization. Block 96 determines if ACCEL exceeds a relatively high threshold acceleration Kaccel, block 98 determines if the previous pedal position PPold is greater than the current value PP, block 100 determines if the difference (PP-PPold) exceeds a threshold rate Krate, and block 102 determines if the difference (ACCEL-ACCEL_ONSET) is less than the minimum deceleration table entry D1. Each of the blocks 96, 98, 100, 102 must be answered in the negative to proceed with data collection; thus, a "normal" braking condition is defined as one in which (1) ACCEL<Kaccel, (2) PPold<PP, (3)

PP−PPold<Krate, and (4) ACCEL−ACCEL_ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 96, 98, 100, 102 is answered in the affirmative, the blocks 104–124 are skipped, and the control unit 50 proceeds to block 126, as indicated by the circled letter B.

Figure 4:
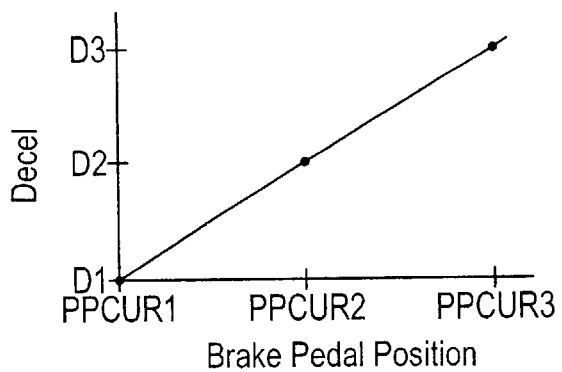
FIG. 4 is a graph depicting an exemplary brake system characterization according to this invention.

The data collection blocks 104–124 identify the brake pedal positions P1, P2, P3 corresponding to the respective predefined vehicle deceleration values D1, D2, D3, and periodically update a brake system characterization table corresponding to the graph of FIG. 4. The blocks 104, 110 and 116 respectively determine if the pedal positions P1, P2 and P3 have been identified, based on the status of the D1 FLAG, the D2 FLAG and the D3 FLAG. If block 104 determines that the D1 FLAG is not true, the block 106 determines if the difference (ACCEL−ACCEL_ONSET) has reached the predefined deceleration value identified in FIG. 4 as D1. If not, the data collection portion of the routine is exited; if so, the block 108 sets the D1 FLAG to true, and uses the current value of PP to update the pedal position variable P1 as shown. On the next execution of the routine, block 106 will be answered in the affirmative, and block 110 will determine if the D2 FLAG is true. If not, the block 112 determines if the difference (ACCEL−ACCEL_ONSET) has reached the predefined deceleration value identified in FIG. 4 as D2. If not, the data collection portion of the routine is exited; if so, the block 114 sets the D2 FLAG to true, and uses the current value of PP to update the pedal position variable P2 as shown. On the next execution of the routine, blocks 106 and 110 will both be answered in the affirmative, and block 116 will determine if the D3 FLAG is true. If not, the block 118 determines if the difference (ACCEL−ACCEL_ONSET) has reached the predefined deceleration value identified in FIG. 4 as D3. If not, the data collection portion of the routine is exited; if so, the block 120 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 120 is not executed, and any pedal position data collected during the respective brake application is discarded.

After each successful data collection, the block 122 compares the brake event counter BEC_CTR to a calibrated threshold K_BEC indicative of the number of braking events needed to update the braking system characterization table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 124 re-calculates the braking system characterization table values PPCUR1, PPCUR2, PPCUR3 by dividing the respective pedal position summation values PS1, PS2, PS3 by the brake event counter BEC_CTR. In other words, PPCUR1=PS1/BEC_CTR, PPCUR2=PS2/BEC_CTR and PPCUR3=PS3/BEC_CTR. Block 124 also saves the old table values for updating V_WT, stores the current value of BRAKE_HEAT as UPDATE_BRAKE_HEAT, and resets the brake event counter BEC_CTR and the position summation values PS1, PS2, PS3 to zero.

Once the data collection portion of the routine has been completed or exited, the block 126 is executed to determine if the brake pedal position PP is at least as great as the lowest characterization value PPCUR1. If not, the block 128 skipped; if so, the block 128 is executed to update BRAKE_TQ and SURFACE_MU. The brake torque BRAKE_TQ is determined using equation (1), the vehicle weight V_WT is updated using equations (3) and (4), and SURFACE_MU is estimated using equation (5). Block 130 then checks for insipient wheel lock. If insipient wheel lock is not detected, the routine is exited; if insipient wheel lock is detected, the block 132 sets the ABS FLAG to TRUE, and the block 134 determines the value of ABS_COMMAND.

In a conventional ABS system, ABS_COMMAND is determined by table look-up as a function of vehicle deceleration and wheel slip as described above in reference to FIG. 2. For operating points in Region I, ABS_COMMAND indicates that ABS control should be exited; for operating points in Region II, ABS_COMMAND indicates that the respective brake pressure should be increased, decreased or maintained at the current value. In most applications, ABS_COMMAND values for different combinations of deceleration and wheel slip are stored as digital numbers, with the magnitude of the numbers corresponding to the commanded action. For example, if the retrieved value of ABS_COMMAND is less than a relatively low threshold, it indicates that ABS control should be exited; if ABS_COMMAND is in successively higher ranges, it indicates a rate at which the respective brake pressure should be decreased, that the respective pressure should be maintained, or a rate at which the respective pressure should be increased. According to this invention, however, the ABS_COMMAND value retrieved from the table is reduced as a function of the brake release rate BRR, and BRAKE_TQ whenever BRR is greater than zero, as indicated at block 134. In the illustrated embodiment, this is achieved with the expression:

$$ABS\_COMMAND = ABS\_COMMAND\_R - (BRR*BRAKE\_TQ) \qquad (6)$$

where ABS_COMMAND_R is the ABS Command value retrieved from the deceleration vs. wheel slip look-up table. In the above expression, BRR cannot have a negative value, and ABS_COMMAND=ABS_COMMAND_R when brake pedal 30 is not being released. However, when the brake pedal 30 is being released, ABS_COMMAND is reduced as a function of both BRR and BRAKE_TQ, thereby biasing ABS_COMMAND toward less aggressive ABS control.

Referring to FIG. 7, the control unit 50 then executes block 140 to determine if ABS_COMMAND indicates that ABS control should be exited. If not, the blocks 142 and 144 are exited to determine the exit time interval TIME_EXIT and to carry out a conventional ABS control algorithm based on the ABS_COMMAND determined at block 134. The exit time interval TIME_EXIT is utilized when the ABS_COMMAND indicates that ABS control should be exited—that is, when block 140 is answered in the affirmative. As indicated at block 142, TIME_EXIT is computed using the expression:

$$TIME\_EXIT = Kexit*(1-SURFACE\_MU) \qquad (7)$$

where Kexit is a relatively long time interval that would be appropriate for a very low road surface coefficient of friction. As the estimated road surface coefficient of friction SURFACE_MU increases, however, the computed value of TIME_EXIT decreases.

When block 140 determines that ABS_COMMAND indicates that ABS control should be exited, the blocks 146–158 are executed to determine how quickly ABS control should be exited. If the brake release rate BRR is relatively high, as determined at block 146, the blocks 148 and 150 are executed to determine if the actual vehicle deceleration exceeds the vehicle deceleration ACCEL_DES desired by the driver. Block 148 determines ACCEL_DES by using the brake system characterization table to determine the desired brake torque BRAKE_TQ_DES, compensated for vehicle weight V_WT, and then converting BRAKE_TQ_DES to a corresponding desired vehicle deceleration ACCEL_DES. In the illustrated embodiment, BRAKE_TQ_DES is determined according to the expression $$BRAKE\_TQ\_DES=[((PP-BRR-PPCUR1)*(PPCUR3-PPCUR1)/(D3-D1))*Kbt]+(UPDATE\_BRAKE\_HEAT-BRAKE\_HEAT)*Kheat \quad (8)$$

provided that the difference (PP−BRR) exceeds the lowest pedal position table value PPCUR1. Reducing the pedal position PP by the release rate BRR causes BRAKE_TQ_DES to lead or anticipate BRAKE_TQ based on driver intent. The desired deceleration, in turn, is given by:

$$ACCEL\_DES=BRAKE\_TQ\_DES*Kd \quad (9)$$

where Kd is a deceleration constant. If the actual acceleration ACCEL exceeds ACCEL_DES by more than a reference amount Kdd, the block 150 is answered in the affirmative, and the block 158 is executed to exit ABS control by setting the ABS FLAG to FALSE.

If the brake release rate BRR is less than Kbrr, or ACCEL<=ACCEL_DES, the blocks 152 and 154 are exited to decrement the exit time interval TIME_EXIT and to check if TIME_EXIT has reached zero. Once TIME_EXIT reaches zero, block 154 is answered in the affirmative, and block 158 is executed to exit ABS control by setting the ABS FLAG to FALSE. Otherwise, the block 156 is executed to determine if the BRAKE_TQ, compensated for the estimated vehicle weight V_WT, is significantly less than the maximum possible brake torque, given the estimated road surface coefficient of friction SURFACE_MU. Thus, block 156 compares (BRAKE_TQ/V_WT) to (SURFACE_MU*Kmbt), where Kmbt is the maximum brake torque achievable on a high road surface coefficient of friction. If the quantity (BRAKE_TQ/V_WT) exceeds the product (SURFACE_MU*Kmbt) by at least at release constant Krel, block 156 will be answered in the affirmative, and block 158 will be executed to exit ABS control by setting the ABS FLAG to FALSE.

In summary, the control of this invention provides a reliable and cost-effective way of adaptively adjusting the exit criteria for an ABS system based on the brake pedal release rate and brake system characterization data to reduce the ABS exit delay when the brake pedal 30 is only partially released. The ABS control term ABS_COMMAND is adaptively adjusted based on BRAKE_TQ and BRR, and TIME_EXIT is adaptively adjusted based on SURFACE_MU. The ABS control is exited if ABS_COMMAND indicates that ABS control should be exited for at least TIME_EXIT, or before the TIME_EXIT elapses if (1) BRR exceeds a threshold and the vehicle deceleration is higher than the desired deceleration, or (2) if BRAKE_TQ is significantly less than the maximum possible brake torque, given SURFACE_MU. While the brake system characterization table is depicted as being developed for purposes of estimating BRAKE_TQ and SURFACE_MU, for example, it may be also be advantageously used for diagnosing brake system abnormalities. While described in reference to the illustrated embodiment, it is expected that various modifications in addition to those mentioned above will occur to those skilled in the art. For example, the control is applicable to other types of ABS systems, and other types of vehicles, including electric or hybrid vehicles that utilize electric or regenerative braking to decelerate the vehicle. Thus, it will be understood that the scope of this invention is not limited to the illustrated embodiment, and that control methods incorporating these and other modifications may fall within the scope of this invention, which is defined by the appended claims.

What is claimed is:

1. A method of operation for a vehicle braking system including a driver manipulated brake pedal and an ABS system for modulating vehicle braking when activated based on an ABS command, the method comprising the steps of:

detecting a rate of change in brake pedal movement when the driver is releasing the brake pedal;

biasing the ABS command toward deactivation of the ABS system in response to the detected rate of change in brake pedal movement when the ABS system is activated;

deactivating the ABS system if the ABS command indicates that the ABS system should be deactivated for at least an exit time interval.

2. The method of claim 1, including the steps of:

estimating a road surface coefficient of friction; and adaptively adjusting said exit time interval based on the estimated road surface coefficient of friction.

3. The method of claim 2, wherein the exit time interval is adjusted in inverse relation to the estimated road surface coefficient of friction.

4. The method of claim 2, including the steps of:

periodically measuring vehicle deceleration and a brake pedal position during activation of the braking system;

constructing and periodically updating a brake system characterization table representing a relationship between the measured vehicle deceleration and measured brake pedal position;

estimating said road surface coefficient of friction based on the characterization table and changes in the characterization table.

5. The method of claim 1, including the steps of:

periodically measuring vehicle deceleration and a brake pedal position during activation of the braking system;

determining a desired vehicle deceleration based on the measured brake pedal position and the detected rate of change in brake pedal movement; and deactivating the ABS system if the ABS command indicates that the ABS system should be deactivated and the measured deceleration exceeds the desired vehicle deceleration.

6. The method of claim 5, including the steps of:

constructing and periodically updating a brake system characterization table representing a relationship between the measured vehicle deceleration and measured brake pedal position; and determining an anticipated brake pedal position by decreasing the measured brake pedal position in relation to the detected rate of change in brake pedal movement; and determining the desired vehicle deceleration by retrieving a vehicle deceleration from the characterization table corresponding to the anticipated brake pedal position.

7. The method of claim 1, including the steps of:

measuring a brake pedal position;

estimating a brake torque corresponding to the measured brake pedal position;

estimating a road surface coefficient of friction;

determining a maximum braking torque corresponding to the estimated road surface coefficient of friction; and deactivating the ABS system if the ABS command indicates that the ABS system should be deactivated and the estimated brake torque is less than said maximum braking torque.

8. The method of claim 7, including the steps of:

periodically measuring vehicle deceleration and a brake pedal position during activation of the braking system;

constructing and periodically updating a brake system characterization table representing a relationship between the measured vehicle deceleration and measured brake pedal position;

estimating the brake torque based on the measured brake pedal position and said characterization table; and estimating said road surface coefficient of friction based on the characterization table and changes in the characterization table.

9. A method of operation for a vehicle braking system including a driver-manipulated brake pedal and an ABS system for modulating vehicle braking when activated based on an ABS command, the method comprising the steps of:

estimating a road surface coefficient of friction; and adaptively adjusting an exit time interval based on the estimated road surface coefficient of friction; and deactivating the ABS system if the ABS command indicates that the ABS system should be deactivated for at least said exit time interval.

10. The method of claim 9, including the steps of:

periodically measuring vehicle deceleration and a brake pedal position during activation of the braking system;

detecting a rate of change in brake pedal movement when the driver is releasing the brake pedal;

determining a desired vehicle deceleration based on the measured brake pedal position and the detected rate of change in brake pedal movement; and deactivating the ABS system if the ABS command indicates that the ABS system should be deactivated and the measured deceleration exceeds the desired vehicle deceleration.

11. The method of claim 10, wherein including the steps of:

constructing and periodically updating a brake system characterization table representing a relationship between the measured vehicle deceleration and measured brake pedal position; and determining an anticipated brake pedal position by decreasing the measured brake pedal position in relation to the detected rate of change in brake pedal movement; and determining the desired vehicle deceleration by retrieving a vehicle deceleration from the characterization table corresponding to the anticipated brake pedal position.

12. The method of claim 9, including the steps of:

measuring a brake pedal position;

estimating a brake torque corresponding to the measured brake pedal position;

estimating a road surface coefficient of friction;

determining a maximum braking torque corresponding to the estimated road surface coefficient of friction; and deactivating the ABS system if the ABS command indicates that the ABS system should be deactivated and the estimated brake torque is less than said maximum braking torque.

13. The method of claim 12, including the steps of:

periodically measuring vehicle deceleration and a brake pedal position during activation of the braking system;

constructing and periodically updating a brake system characterization table representing a relationship between the measured vehicle deceleration and measured brake pedal position;

estimating the brake torque based on the measured brake pedal position and said characterization table; and estimating said road surface coefficient of friction based on the characterization table and changes in the characterization table.

14. A method of operation for a vehicle braking system including a driver-manipulated brake pedal and an ABS system for modulating vehicle braking when activated based on an ABS command, the method comprising the steps of:

periodically measuring vehicle deceleration and a brake pedal position during activation of the braking system;

detecting a rate of change in brake pedal movement when the driver is releasing the brake pedal;

determining a desired vehicle deceleration based on the measured brake pedal position and the detected rate of change in brake pedal movement; and deactivating the ABS system if the ABS command indicates that the ABS system should be deactivated and the measured deceleration exceeds the desired vehicle deceleration.

15. The method of claim 14, including the steps of:

estimating a brake torque corresponding to the measured brake pedal position;

estimating a road surface coefficient of friction;

determining a maximum braking torque corresponding to the estimated road surface coefficient of friction; and deactivating the ABS system if the ABS command indicates that the ABS system should be deactivated and the estimated brake torque is less than said maximum braking torque.

16. A method of operation for a vehicle braking system including a driver-manipulated brake pedal and an ABS system for modulating vehicle braking when activated based on an ABS command, the method comprising the steps of:

measuring a brake pedal position;

estimating a brake torque corresponding to the measured brake pedal position;

estimating a road surface coefficient of friction;

determining a maximum braking torque corresponding to the estimated road surface coefficient of friction; and deactivating the ABS system if the ABS command indicates that the ABS system should be deactivated and the estimated brake torque is less than said maximum braking torque.

* * * * *